US010666825B2

(12) United States Patent
Yamaguchi

(10) Patent No.: US 10,666,825 B2
(45) Date of Patent: May 26, 2020

(54) IMAGE FORMING APPARATUS, IMAGE FORMING METHOD, AND READING MEDIUM THAT ENSURE EFFICIENT USE OF WEEKLY TIMER

(71) Applicant: Kyocera Document Solutions Inc., Osaka (JP)

(72) Inventor: Keiko Yamaguchi, Concord, CA (US)

(73) Assignee: Kyocera Document Solutions Inc., Osaka (JP)

( * ) Notice: Subject to any disclaimer, the term of this patent is extended or adjusted under 35 U.S.C. 154(b) by 37 days.

(21) Appl. No.: 15/434,301

(22) Filed: Feb. 16, 2017

(65) Prior Publication Data

US 2018/0234570 A1 Aug. 16, 2018

(51) Int. Cl.
*H04N 1/00* (2006.01)
*G06F 3/12* (2006.01)

(52) U.S. Cl.
CPC ....... *H04N 1/00896* (2013.01); *G06F 3/1221* (2013.01); *G06F 3/1229* (2013.01); *G06F 3/1267* (2013.01); *H04N 1/00891* (2013.01); *G06F 3/1205* (2013.01); *G06F 3/1207* (2013.01); *H04N 2201/0094* (2013.01); *Y02D 10/1592* (2018.01)

(58) Field of Classification Search
CPC .. H04N 1/00896; G06F 3/1221; G06F 1/3206
See application file for complete search history.

(56) References Cited

U.S. PATENT DOCUMENTS

2006/0274348 A1* 12/2006 Suzuki ............... H04N 1/00233
358/1.13
2012/0002220 A1* 1/2012 Zhan .................. G03G 15/5004
358/1.9
2012/0229831 A1* 9/2012 Kuroishi ............ H04N 1/00891
358/1.13
2014/0376024 A1* 12/2014 Masuyama ........... G06F 3/1221
358/1.14

FOREIGN PATENT DOCUMENTS

JP 2007-108855 A 4/2007
JP 2010-020655 A 1/2010

* cited by examiner

Primary Examiner — Andrew H Lam
(74) Attorney, Agent, or Firm — James Judge

(57) ABSTRACT

An image forming method includes operating, receiving, and setting. The operating includes operating in an operation mode of a plurality of operation modes. The operation modes includes a first electric power mode configured to perform an image formation process and a second electric power mode configured to consume a power less than a power of the first electric power mode and not to perform the image formation process. The receiving includes receiving a print job. The setting includes switching the operation mode to the second electric power mode after a lapse of a preset first standby period after a completion of the print job. When the print job including a sleep transition command is received in the second time slot, the switching includes switching the operation mode to the second electric power mode before the lapse of the first standby period.

11 Claims, 7 Drawing Sheets

IMAGE FORMING APPARATUS, IMAGE FORMING METHOD, AND READING MEDIUM THAT ENSURE EFFICIENT USE OF WEEKLY TIMER

BACKGROUND

Unless otherwise indicated herein, the description in this section is not prior art to the claims in this application and is not admitted to be prior art by inclusion in this section.

Some typical image forming apparatuses (for example, printers, multifunction printers, or multifunction peripherals) include a so-called weekly timer. With the weekly timer, switching between normal mode and sleep mode of the image forming apparatus is set every day of the week and time slots to ensure a reduction in wasteful power consumption. From an aspect of the reduction in power consumption, there has been proposed a sleep mode transition temporary lock command to avoid a transition to a sleep mode unintended by a user. The sleep mode transition temporary lock command is a command to lock the transition to the sleep mode for a predetermined period. Meanwhile, the following technique has also been proposed. When a command to instruct releasing a power-saving mode is input, performing an image forming operation based on only print data of the user who has instructed the release of the power-saving mode prevents a plurality of users from successively discharging printed matters.

However, the technique has not sufficiently examined in terms of the effective reduction in power consumption when the user exceptionally uses the image forming apparatus in the time slot during which the power supply is preliminary set to off by the weekly timer.

SUMMARY

An image forming method according to a first aspect of the disclosure includes operating, receiving, and setting. The operating includes operating in an operation mode of a plurality of operation modes. The operation modes includes a first electric power mode configured to perform an image formation process and a second electric power mode configured to consume a power less than a power of the first electric power mode and not to perform the image formation process. The receiving includes receiving a print job including print information indicative of a print content and image data as a print target. The setting includes setting the first electric power mode in a preset first time slot, setting the second electric power mode in a preset second time slot, and switching the operation mode to the second electric power mode after a lapse of a preset first standby period after a completion of the print job. When the print job including a sleep transition command is received in the second time slot, the switching includes switching the operation mode to the second electric power mode before the lapse of the first standby period.

An image forming apparatus according to a second aspect of the disclosure includes an image forming unit, a print job receiving unit, and an energy-saving state managing unit. The image forming unit operates in an operation mode of a plurality of operation modes. The operation modes includes a first electric power mode configured to perform an image formation process and a second electric power mode configured to consume a power less than a power of the first electric power mode and not to perform the image formation process. The print job receiving unit receives a print job including print information indicative of a print content and image data as a print target. The energy-saving state managing unit sets the first electric power mode in a preset first time slot, sets the second electric power mode in a preset second time slot, and switches the operation mode to the second electric power mode after a lapse of a preset first standby period after a completion of the print job. When the print job including a sleep transition command is received in the second time slot, the energy-saving state managing unit switches the operation mode to the second electric power mode before the lapse of the first standby period.

A non-transitory computer-readable recording medium according to a third aspect of the disclosure stores an image forming program to control an image forming apparatus. The image forming program includes a program instruction stored in the recording medium. The image forming program causes the image forming apparatus to perform processes including, in execution by at least the one computer: an image formation process that operates in an operation mode of a plurality of operation modes including a first electric power mode configured to perform an image formation process and a second electric power mode configured to consume a power less than a power of the first electric power mode and not to perform the image formation process; a print job receiving process that receives a print job including print information indicative of a print content and image data as a print target; and a switching process that sets the first electric power mode in a preset first time slot, sets the second electric power mode in a preset second time slot, and switches the operation mode to the second electric power mode after a lapse of the preset first standby period after a completion of the print job. When the print job including a sleep transition command is received in the second time slot, the switching process switches the operation mode to the second electric power mode before the lapse of the first standby period.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
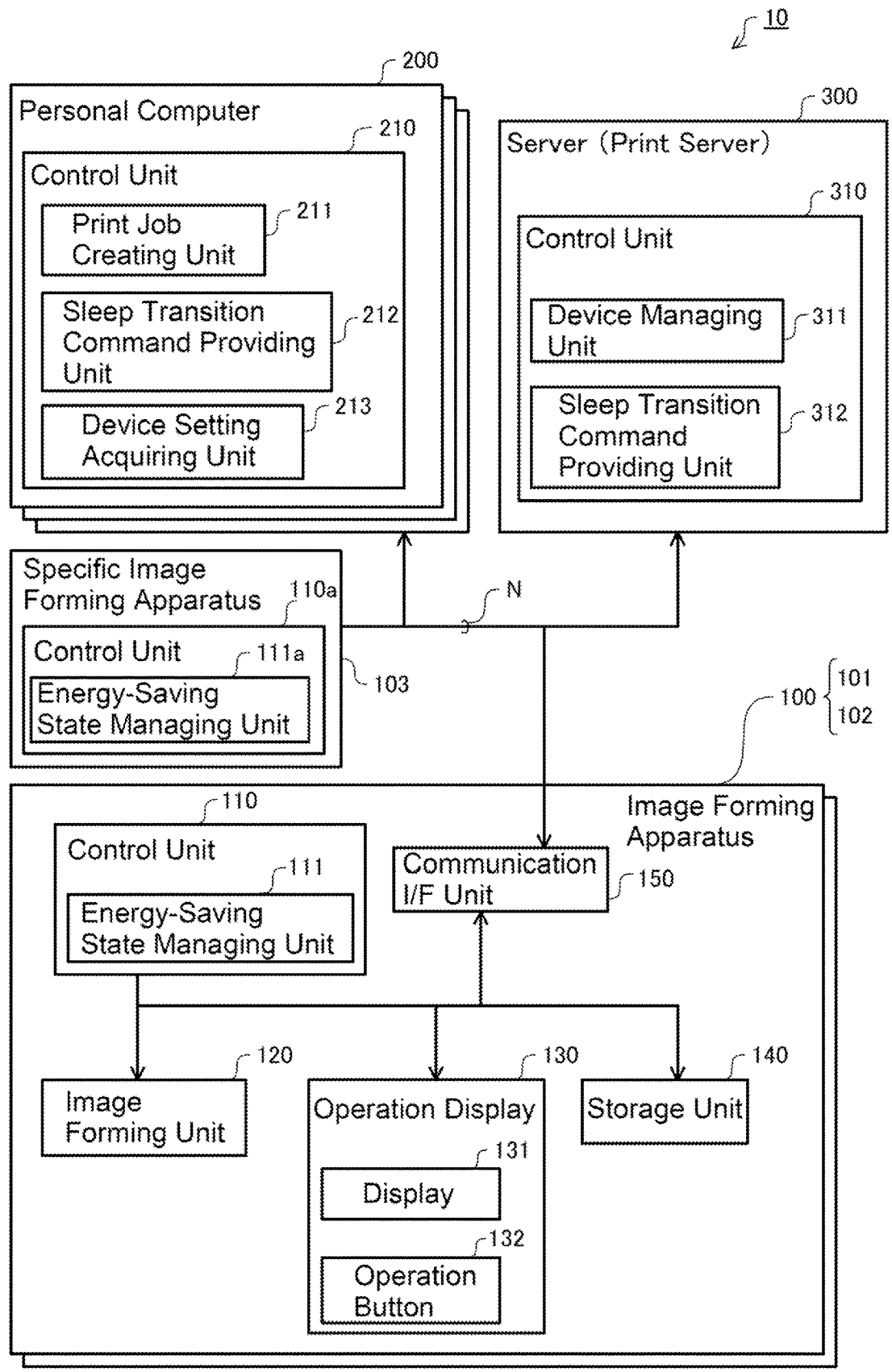
FIG. 1 is a block diagram illustrating a functional configuration of an image forming system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes a configuration for implementing the disclosure (hereinafter referred to as an "embodiment") with reference to the drawings.

A. First Embodiment
B. Second Embodiment
C. Third Embodiment
D. Modifications

A. First Embodiment

FIG. 1 is a block diagram illustrating a functional configuration of an image forming system 10 according to one embodiment of the disclosure. The image forming system 10 includes two image forming apparatuses 101 and 102 as multifunction peripherals (MFPs), one specific image forming apparatus 103, a plurality of personal computers 200, and a server 300. The plurality of personal computers 200 and the server 300 are connected to the two image forming apparatuses 101 and 102 and the one specific image forming apparatus 103 over a wired network N.

In this embodiment, the two image forming apparatuses 101 and 102 have an identical configuration as an image forming apparatus 100. The image forming apparatus 100 includes a control unit 110, an image forming unit 120, an operation display 130, a storage unit 140, and a communication interface unit 150, which functions as a print job receiving unit. The control unit 110 includes an energy-saving state managing unit 111. The one specific image forming apparatus 103 has the configuration identical to the two image forming apparatuses 101 and 102 except that the one specific image forming apparatus 103 includes a control unit 110a with an energy-saving state managing unit 111a instead of the energy-saving state managing unit 111.

The energy-saving state managing unit 111 has a function to cause an operation mode of the image forming apparatuses 101 and 102 to transition from a normal mode to a sleep mode when a print job is not received for a preset standby period (also referred to as a sleep transition period) after a termination of a print job.

The normal mode, which is also referred to as a first electric power mode, is the operation mode in which, for example, an immediate print output is possible after completion of heating a fixing unit (not illustrated). The sleep mode, which is also referred to as a second electric power mode, is the operation mode that, for example, stops heating the fixing unit (not illustrated) to reduce the power consumption. That is, the second electric power mode is the operation mode in which the power consumption is less than that in the first electric power mode. The sleep mode is the operation mode that makes the printing process impossible and is the operation mode that defers the printing process when the print job is received until the heating of the fixing unit (not illustrated) is completed, that is, until the transition to the normal mode. The energy-saving state managing unit 111a, similar to the energy-saving state managing unit 111, has the function to cause the operation mode of the specific image forming apparatus 103 to transition from the normal mode to the sleep mode.

The energy-saving state managing unit 111 further has a function to analyze the print job to determine whether a sleep transition command is provided to the print job. The energy-saving state managing unit 111 has a function to, when the sleep transition command is provided to the print job, immediately cause the operation mode of the image forming apparatuses 101 and 102 to transition from the normal mode to the sleep mode without waiting for a lapse of the preset predetermined period. Meanwhile, the energy-saving state managing unit 111a does not have the function to determine whether the sleep transition command is provided to the print job. The image forming apparatuses 101 and 102 are also referred to as compatible image forming apparatuses that support the sleep transition command. The specific image forming apparatus 103 is also referred to as a non-compatible image forming apparatus that does not support the sleep transition command.

The plurality of personal computers 200 each include control units 210. The control unit 210 includes a print job creating unit 211, a sleep transition command providing unit 212, and a device setting acquiring unit 213. The server 300 includes a control unit 310. The control unit 310 includes a device managing unit 311 and a sleep transition command providing unit 312.

The control units 110, 110a, 210, and 310 include a main storage unit such as a RAM and a ROM, and a controller such as a micro-processing unit (MPU) and a central processing unit (CPU). The control unit 110 has a controller function related to interfaces such as various I/Os, a universal serial bus (USB), a bus, and another hardware. The control units 110, 110a, 210, and 310 each control the entire image forming apparatuses 100, specific image forming apparatus 103, personal computers 200, and server 300.

The operation display 130 includes a display 131, which is configured as a liquid crystal panel with backlight, and an operation button 132. The operation display 130 accepts operation inputs from a user through the display 131, which functions as a touch panel, and various buttons and switches (not illustrated).

The storage unit 140 is a storage device constituted of, for example, a hard disk drive and a flash memory, which are non-transitory recording media. The storage units 140 each store control programs and data for processes executed by the control units 110. The specific image forming apparatus 103, the personal computers 200, and the server 300 each include a storage unit (not illustrated) to store control programs and data for processes executed by the control units 110a, 210, and 310.

Figure 2:
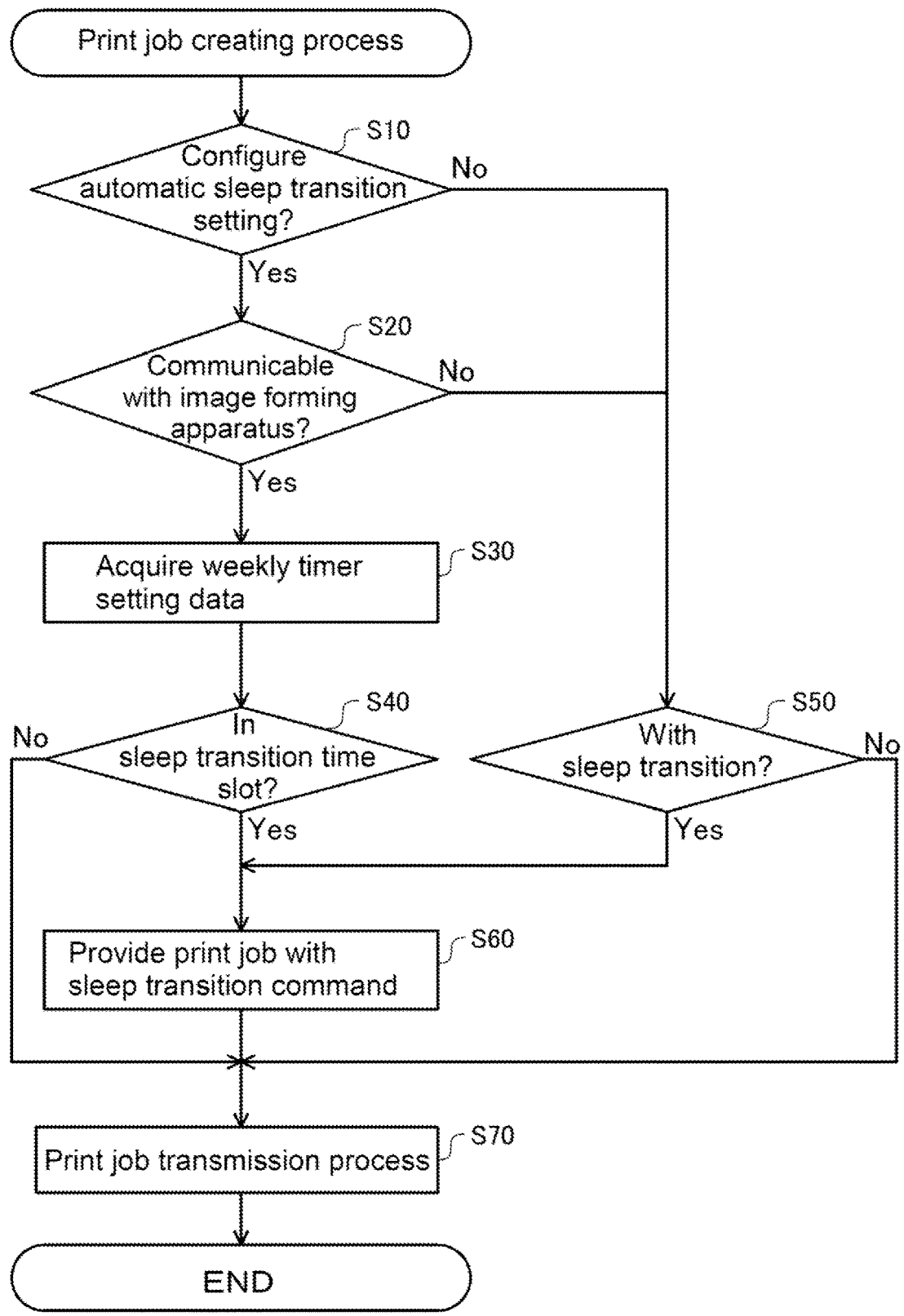
FIG. 2 is a flowchart illustrating a content of a print job creating process according to a first embodiment.

FIG. 2 is a flowchart illustrating a content of a print job creating process according to the first embodiment. At Step S10, the user performs an operation for automatic sleep transition setting. In the automatic sleep transition setting, the user operates the personal computer 200 to set whether to leave a determination whether to provide the sleep transition command to the sleep transition command providing unit 212.

That is, the user selects any one of an automatic setting or a manual setting. In the manual setting, the user further selects a content of the manual setting. The manual setting has options: "Always provide the sleep transition command" (also referred to as an "any-time provision setting"), and "Do not always provide the sleep transition command (also referred to as an "any-time non-provision setting"). Considering the case where the automatic setting cannot be configured due to some sort of reason, the manual setting is selectable while the automatic setting is configured.

When the automatic setting is selected, the sleep transition command providing unit 212 advances the process to Step S20. When the manual setting is selected, the sleep transition command providing unit 212 advances the process to Step S50. At Step S50, with the any-time provision setting selected, the sleep transition command providing unit 212 always provides the print job with the sleep transition command. With the any-time non-provision setting selected, the sleep transition command providing unit 212 does not provide the print job with the sleep transition command at all times.

At Step S20, the device setting acquiring unit 213 attempts communications with a transmission destination for the print job. When the device setting acquiring unit 213 can confirm the communicable state, the device setting acquiring unit 213 advances the process to Step S30. If the device setting acquiring unit 213 cannot confirm the communicable state, the device setting acquiring unit 213 advances the process to Step S50 to switch the process to the process by the manual setting.

At Step S30, the device setting acquiring unit 213 acquires weekly timer setting data from the transmission destination. This example assumes the image forming apparatus 101 as the transmission destination. The weekly timer setting data stores a setting content for the automatic sleep transition at a specific day of the week and time.

At Step S40, the sleep transition command providing unit 212 determines whether the image forming apparatus 101 belongs to a sleep transition time slot based on the weekly timer setting data. When having determined that the image forming apparatus 101 belongs to the sleep transition time slot, the sleep transition command providing unit 212 advances the process to Step S60. When having determined that the image forming apparatus 101 does not belong to the sleep transition time slot, the sleep transition command providing unit 212 advances the process to Step S70. While the sleep transition time slot is also referred to as a second time slot, the other time slot is also referred to as a first time slot.

At Step S60, the sleep transition command providing unit 212 provides the print job with the sleep transition command. At Step S70, the print job creating unit 211 creates the print job and transmits the print job to the image forming apparatus 101. In this embodiment, the print job includes print information indicative of the print content, image data as a print target, print setting information indicative of the content of the print setting, user-specific information indicative of an owner of the print job as a transmission source of the print job, and transmission-destination-specific information indicative of the device as the transmission destination of the print job.

Figure 3:
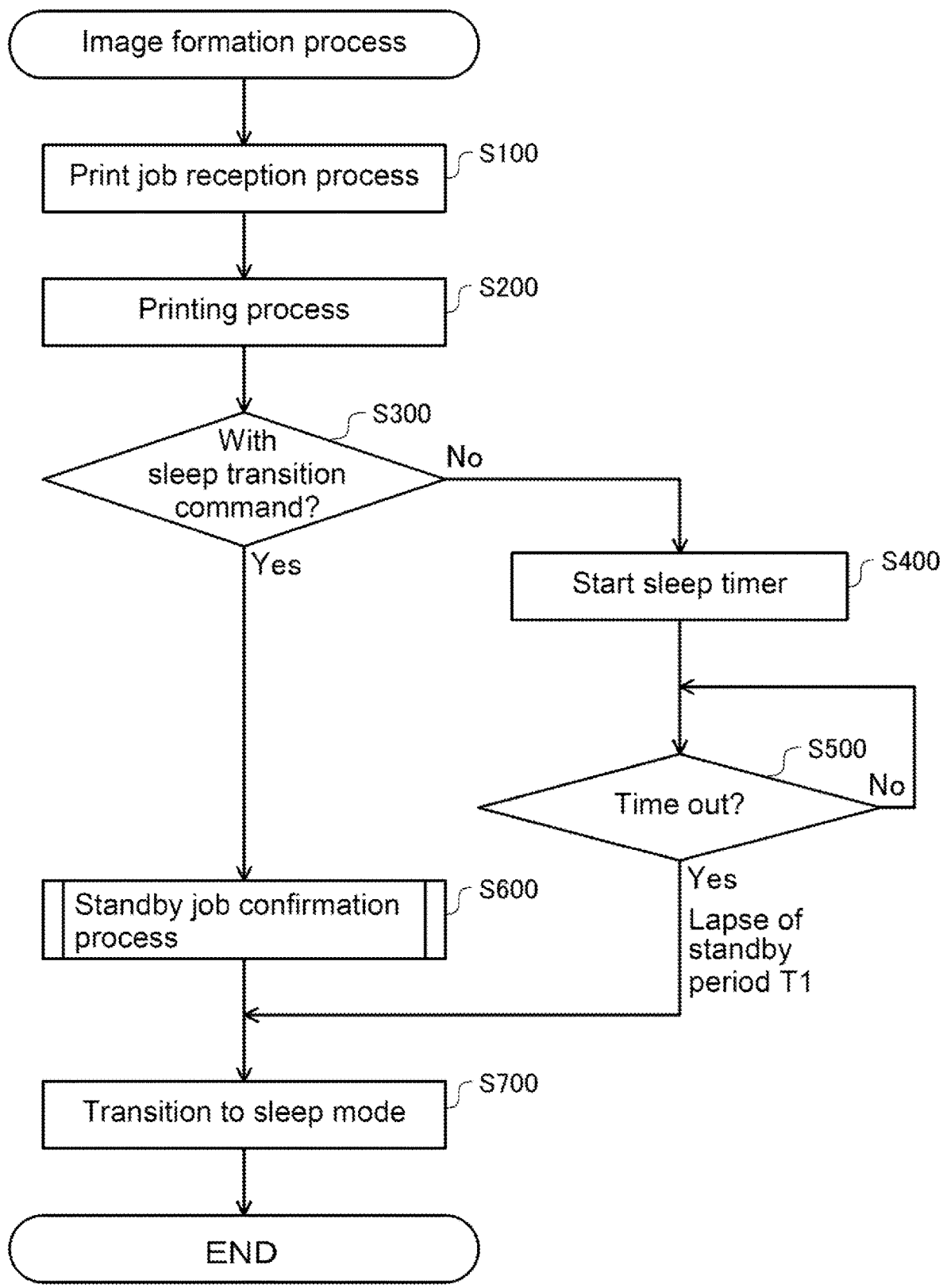
FIG. 3 is a flowchart illustrating a content of an image formation process according to the first embodiment.

FIG. 3 is a flowchart illustrating the content of the image formation process according to the first embodiment. In this example, the image forming apparatus 101 performs the image formation process. At Step S100, the image forming apparatus 101 uses the communication interface unit 150 to receive the print job from the personal computer 200. At Step S200, the image forming apparatus 101 returns the operation mode from the sleep mode to the normal mode to start the printing process based on the received print job.

At Step S300, the energy-saving state managing unit 111 determines whether the print job includes the sleep transition command. When having determined that the print job includes the sleep transition command, the energy-saving state managing unit 111 advances the process to Step S600.

When having determined that the print job does not include the sleep transition command, the energy-saving state managing unit 111 advances the process to Step S400.

At Step S400, the energy-saving state managing unit 111 starts the sleep timer (not illustrated). The sleep timer times out after a lapse of a preset standby period T1. At Step S500, the energy-saving state managing unit 111 stops the process until the sleep timer times out and advances the process to Step S700 in response to the timeout. At Step S700, the energy-saving state managing unit 111 causes the operation mode of the image forming apparatus 101 to transition to the sleep mode.

At Step S600, the energy-saving state managing unit 111 performs a standby job confirmation process. In the standby job confirmation process, the energy-saving state managing unit 111 appropriately changes the transition timing of the operation mode to the sleep mode according to the print job in standby. The print job in standby is also referred to as a print job scheduled to be processed.

Figure 4:
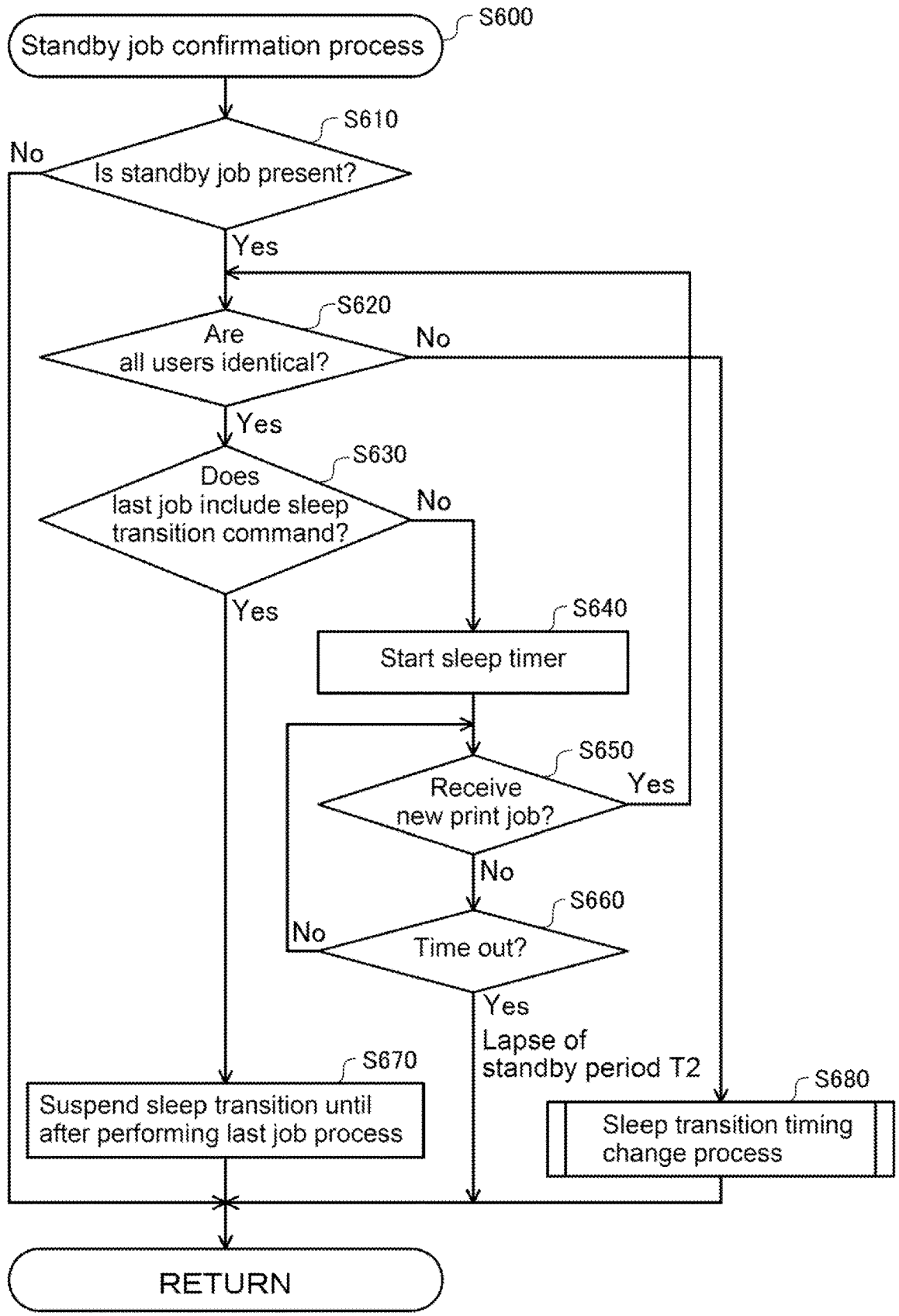
FIG. 4 is a flowchart illustrating a content of a standby job confirmation process according to the first embodiment.

FIG. 4 is a flowchart illustrating the content of the standby job confirmation process according to the first embodiment. At Step S610, the energy-saving state managing unit 111 determines whether the print job in standby is present. When the print job in standby is present, the energy-saving state managing unit 111 advances the process to Step S620. When the print job in standby is absent, the energy-saving state managing unit 111 advances the process to Step S700 (see FIG. 3).

At Step S620, the energy-saving state managing unit 111 determines whether the users of all print jobs in standby are the identical person. This determination is made based on the user-specific information included in all the print jobs in standby.

When the users of all the print jobs in standby are the identical person, the energy-saving state managing unit 111 advances the process to Step S630. When the users of all the print jobs in standby are not the identical person, the energy-saving state managing unit 111 advances the process to Step S680. The process at Step S680 will be described later.

At Step S630, the energy-saving state managing unit 111 determines whether the sleep transition command is provided to a print job processed last (also referred to as a last job) among the print jobs in standby. When the sleep transition command is provided, the energy-saving state managing unit 111 advances the process to Step S670. When the sleep transition command is not provided, the energy-saving state managing unit 111 advances the process to Step S640.

At Step S640, the energy-saving state managing unit 111 starts the sleep timer (not illustrated) considering a possibility of reception of a new print job. In this case, the sleep timer is set so as to time out after a lapse of a standby period T2, which is, for example, half of the preset standby period T1. The standby period T2 is one example of a second standby period.

At Step S650, the energy-saving state managing unit 111 determines whether the print job has been newly received. When having determined that the print job has been newly received, the energy-saving state managing unit 111 returns the process to Step S620. When having determined that the print job has not been newly received, the energy-saving state managing unit 111 advances the process to Step S660. At Step S660, the energy-saving state managing unit 111 stands by until the timeout of the sleep timer and advances the process to Step S700 in response to the timeout.

At Step S670, the energy-saving state managing unit 111 suspends the sleep transition until after performing the last job process. That is, the energy-saving state managing unit 111 ignores the sleep transition command provided to the print job other than the last print job. In other words, when the print job scheduled to be processed, which is the print job scheduled to be processed subsequent to the print job, is detected, the energy-saving state managing unit 111 ignores the sleep transition command. The energy-saving state managing unit 111 immediately causes the operation mode to transition to the sleep mode in response to the sleep transition command after the termination of the last print job without starting the sleep timer.

At Step S680, the energy-saving state managing unit 111 performs a sleep transition timing change process. The sleep transition timing change process is a process performed when the plurality of users transmit the plurality of print jobs in standby.

Figure 5:
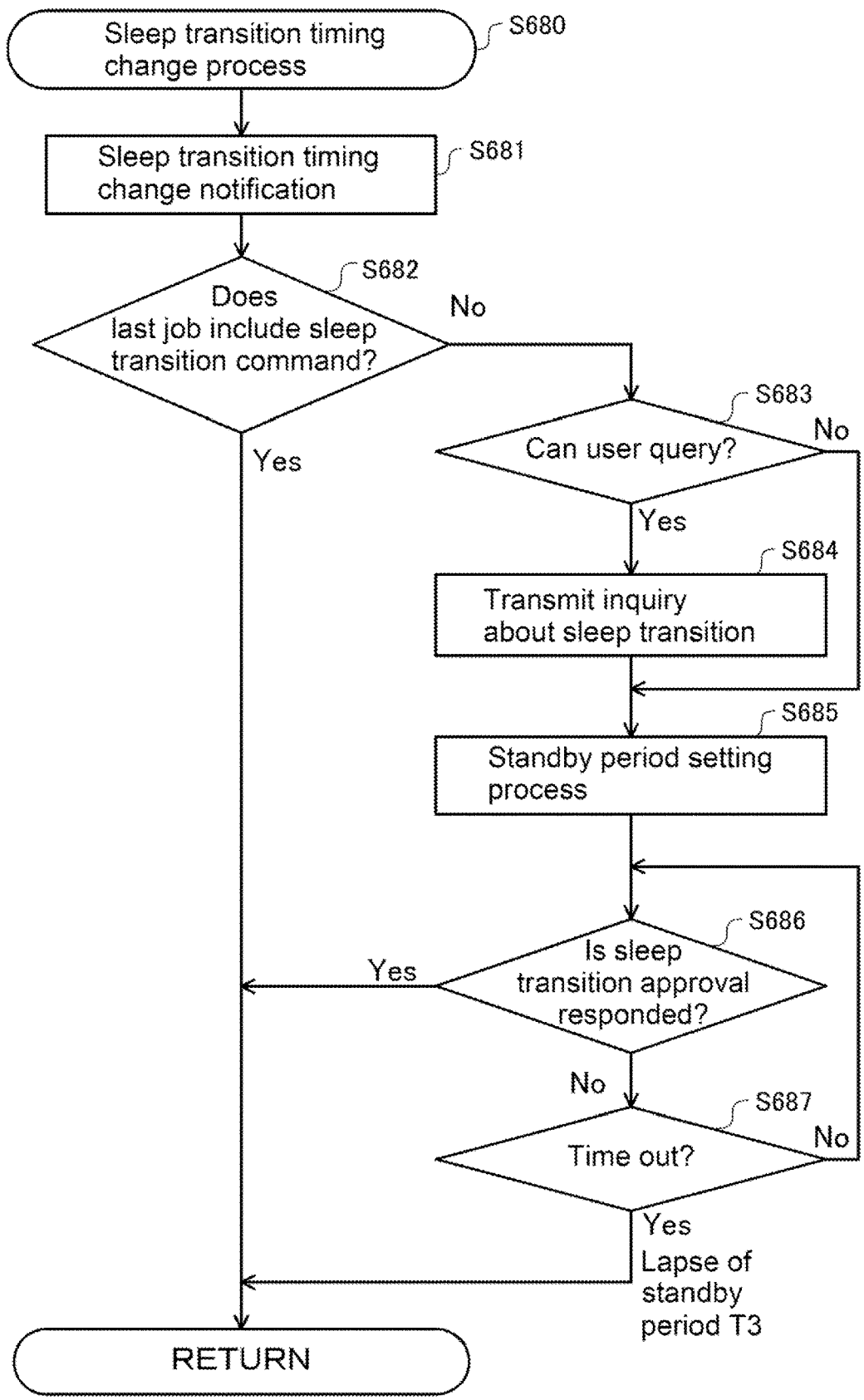
FIG. 5 is a flowchart illustrating a content of a sleep transition timing change process procedure according to the first embodiment.

FIG. 5 is a flowchart illustrating the content of the sleep transition timing change process procedure according to the first embodiment. At Step S681, the energy-saving state managing unit 111 notifies the change in sleep transition timing. When the plurality of users transmit the print jobs, the sleep transition commands provided to the print jobs other than the last print job are ignored. Accordingly, the energy-saving state managing unit 111 notifies the users who have transmitted the print jobs that include the sleep transition commands of "The transition to the sleep mode is performed after the termination of the print jobs of other users." That is, when the owner of the print job including the ignored sleep transition command differs from the owner of the print job scheduled to be processed, the energy-saving state managing unit 111 notifies the owner of the print job including the ignored sleep transition command of the ignorance of the sleep transition command.

At Step S682, the energy-saving state managing unit 111 determines whether the sleep transition command is provided to the last print job. When the sleep transition command is provided to the last print job, the energy-saving state managing unit 111 advances the process to Step S700 (see FIG. 3). When the sleep transition command is not provided to the last print job, the energy-saving state managing unit 111 advances the process to Step S683.

At Step S683, the energy-saving state managing unit 111 determines whether an inquiry to the user is permitted or not. An inquiry target is the personal computer 200 for the user who has transmitted the last print job that does not include the sleep transition command. When this personal computer 200 responds to the inquiry, the energy-saving state managing unit 111 advances the process to Step S684. When this personal computer 200 does not respond to the inquiry, the energy-saving state managing unit 111 advances the process to Step S685.

At Step S684, the energy-saving state managing unit 111 transmits the inquiry regarding the sleep transition. The content of the inquiry is to confirm whether the transition to the sleep mode is allowed to be performed after the termination of the print job. The personal computer 200 can query the user through, for example, a pop-up display on the display (not illustrated).

At Step S685, the energy-saving state managing unit 111 sets the standby period. Assuming the use of the mage forming apparatus 101 by the plurality of users, as the standby period, for example, a standby period T3 shorter than the standby period T2 can be set. The standby period T3 is one example of the second standby period.

At Step S686, the energy-saving state managing unit 111 prepares for a reception of a sleep transition approval command, which is communications from the personal computer 200 indicative of an approval of the sleep transition during standby. When the sleep transition approval command is received during the standby, the energy-saving state managing unit 111 advances the process to Step S700. When the sleep transition approval command is not received during the standby, the energy-saving state managing unit 111 immediately advances the process to Step S687. At Step S687, the energy-saving state managing unit 111 stands by until the sleep timer times out and advances the process to Step S700 in response to the timeout.

Thus, the image forming system 10 according to the first embodiment includes the sleep transition command in the print job. This ensures the effectively reduced power consumption when the user exceptionally uses the image forming system 10 in the time slot during which the power supply is preliminary set to off by the weekly timer.

B. Second Embodiment

Figure 6:
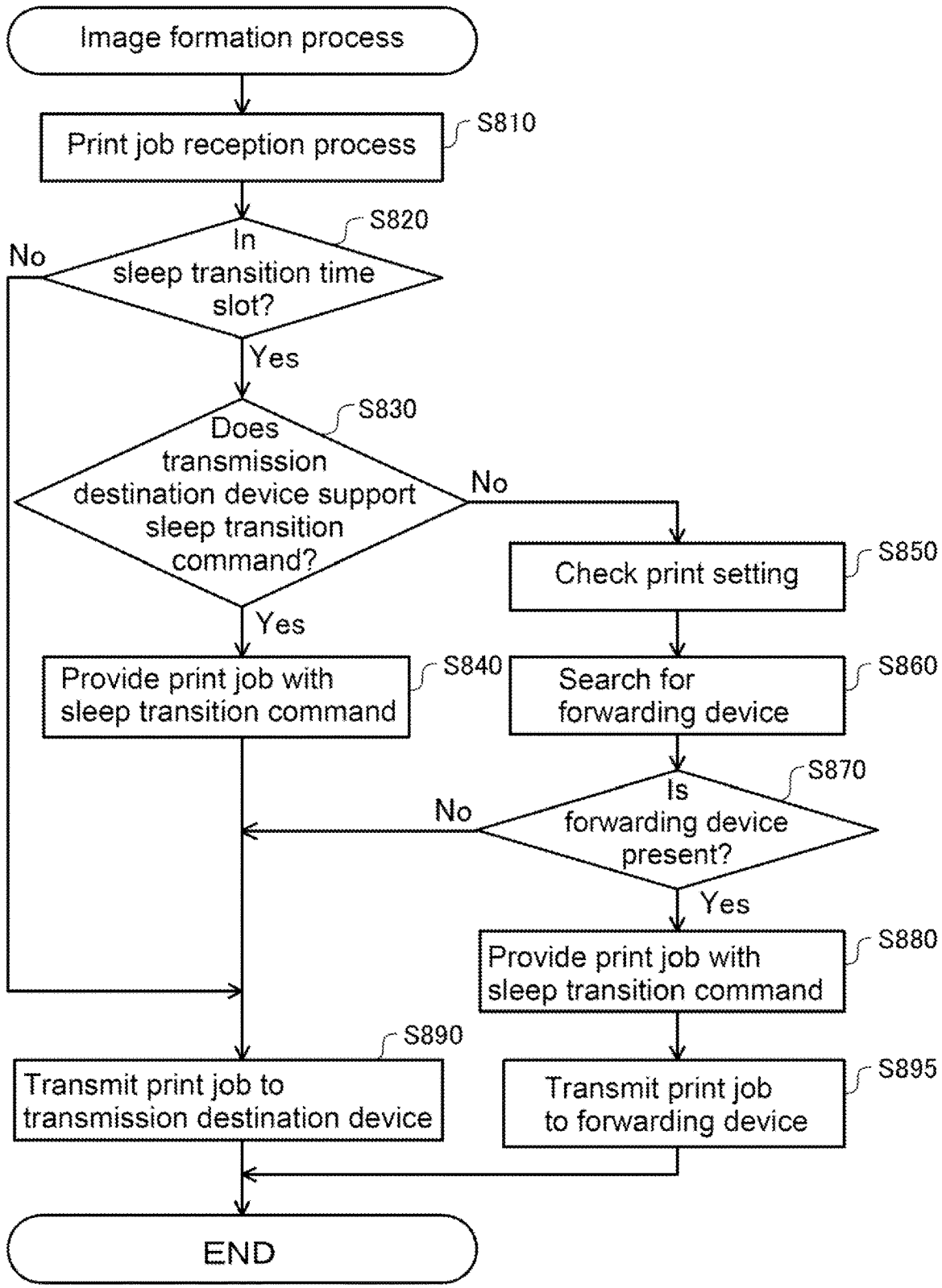
FIG. 6 is a flowchart illustrating a content of an image formation process according to a second embodiment.

FIG. 6 is a flowchart illustrating a content of an image formation process according to the second embodiment. The second embodiment differs from the first embodiment in that the server 300 functioning as a print server can be used to provide the print job with the sleep transition command. This configuration, in addition to the image formation process according to the first embodiment, can perform the image formation process according to the second embodiment.

At Step S810, the server 300 receives the print job from the personal computer 200. This example assumes that the server 300 functions as the print server, and any one of the two image forming apparatuses 101 and 102 (supporting the sleep transition command) and the one specific image forming apparatus 103 (not supporting the sleep transition command) are specified as the transmission destination for the print job.

At Step S820, the device managing unit 311 in the server 300 determines whether the transmission destination belongs to the sleep transition time slot based on the weekly timer setting data. It is assumed that the device managing unit 311 preliminarily obtains the weekly timer setting data from all the image forming apparatuses 101, 102, and 103 and updates the weekly timer setting data at a preset period. Alternatively, the server 300 may set the weekly timers for all the image forming apparatuses 101, 102, and 103 in a centralized manner.

When having determined that the transmission destination belongs to the sleep transition time slot, the device managing unit 311 advances the process to Step S830. When having determined that the transmission destination does not belong to the sleep transition time slot, the device managing unit 311 advances the process to Step S890.

At Step S830, the device managing unit 311 determines whether the transmission destination device supports the sleep transition command. When the transmission destination device supports the sleep transition command (that is, any of the image forming apparatuses 101 and 102 is the transmission destination device), the device managing unit 311 advances the process to Step S840. When the transmission destination device does not support the sleep transition command (that is, the specific image forming apparatus 103 is the transmission destination device), the device managing unit 311 advances the process to Step S850. The transmission destination device can be specified based on the transmission-destination-specific information included in the print job.

At Step S840, the sleep transition command providing unit 312 in the server 300 provides the print job received from the personal computer 200 with the sleep transition command. At Step S890, the device managing unit 311 transmits the print job to which the sleep transition command is provided to the transmission destination (for example, the image forming apparatus 101) supporting the sleep transition command.

At Step S850, the device managing unit 311 checks the content of the print setting for the print job received from the personal computer 200. The content of the print setting can be checked based on the print setting information included in the print job. The content of the print setting includes, for example, the print setting for color printing or monochrome printing. This example assumes that, for example, the color printing has been selected as the print setting.

At Step S860, the device managing unit 311 searches for a forwarding device. The target for the search process is the forwarding destination that supports the sleep transition command and the color printing. When the forwarding device is found, the device managing unit 311 advances the process to Step S880. When the forwarding device is not found, the device managing unit 311 advances the process to Step S890 without providing the sleep transition command (Step S870).

At Step S880, the sleep transition command providing unit 312 provides the print job with the sleep transition command. At Step S895, the device managing unit 311 transmits the print job to which the sleep transition command is provided to the forwarding destination (for example, the image forming apparatus 101). The device managing unit 311 may notify the personal computer 200, the transmission source of the print job, of the transfer of the print job.

Thus, even if the specific image forming apparatus 103, which does not support the sleep transition command, is connected over the network, the image forming system 10 according to the second embodiment can appropriately transfer and process the sleep transition command to the image forming apparatuses 101 and 102, which support the sleep transition command. Accordingly, the image forming system 10 can effectively use the image forming apparatuses 101 and 102, which support the sleep transition command, to effectively reduce the power consumption.

C. Third Embodiment

Figure 7:
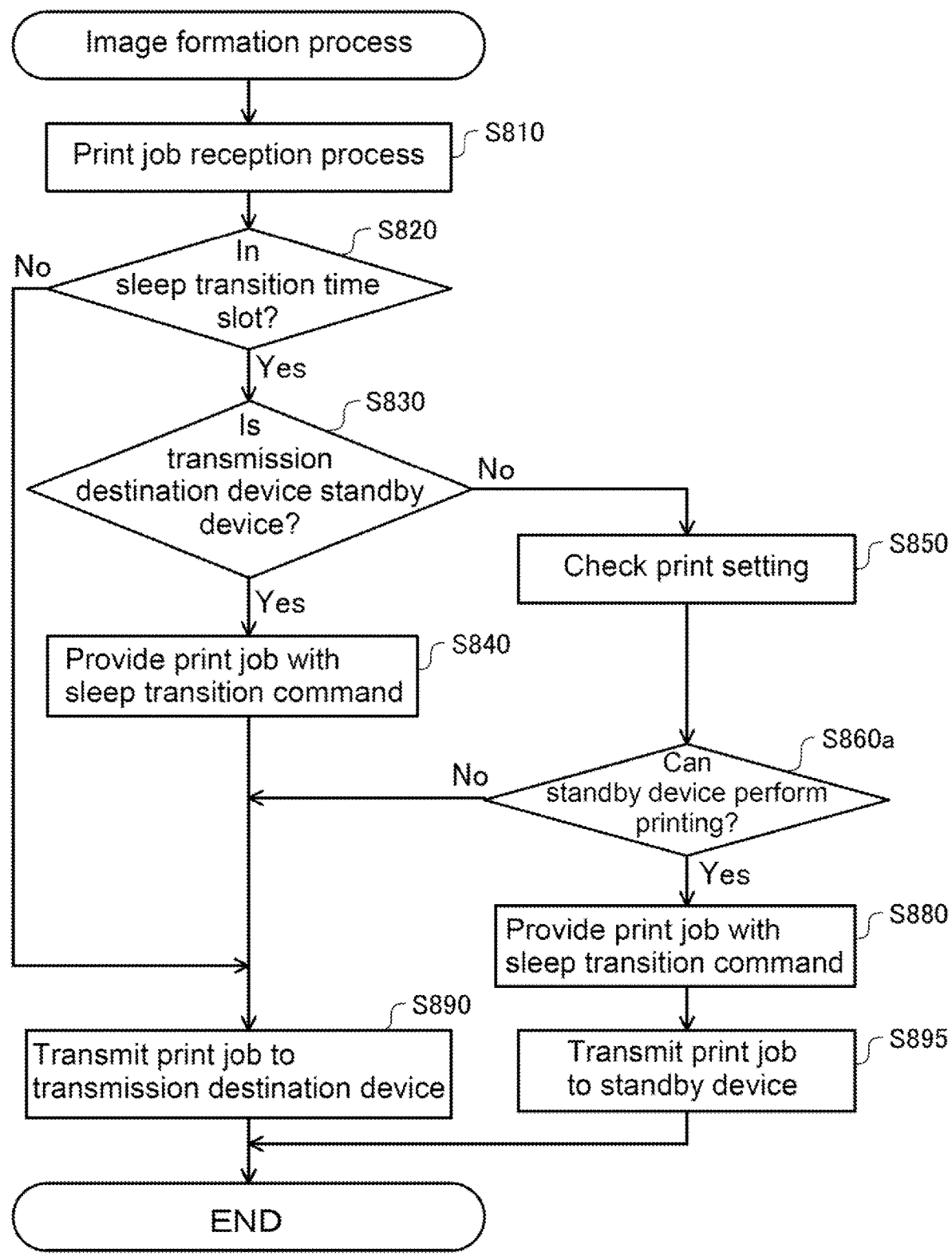
FIG. 7 is a flowchart illustrating a content of an image formation process according to a third embodiment.

FIG. 7 is a flowchart illustrating a content of an image formation process according to the third embodiment. The third embodiment differs from the first embodiment in that the server 300 functioning as a print server can be used to provide the print job with the sleep transition command. This configuration, in addition to the image formation processes according to the first and the second embodiments, can perform the image formation process according to the third embodiment.

The image formation process according to the third embodiment differs from the image formation process according to the second embodiment in that the processes at Step S860 and Step S870 are replaced by Step S860a, otherwise, the processes are identical. The image formation process according to the third embodiment is usable when a plurality of transmission destination devices (for example, the image forming apparatuses 101 and 102) support the sleep transition command.

At Step S860a, the device managing unit 311 does not search for the forwarding device like Step S860 but determines whether the standby device (for example, the image forming apparatus 101) preliminary selected based on the content of the print setting can perform the printing (namely, processable). The standby device is also referred to as a standby image forming apparatus.

When having determined that the standby device can perform the printing, the server 300 advances the process to Step S880 to perform the process similar to that of the second embodiment. Meanwhile, when determining that the standby device cannot perform the printing, the server 300 advances the process to Step S890 without transferring the print job and performs the process similar to that of the second embodiment.

Thus, when the plurality of transmission destination devices support the sleep transition command, the image forming system 10 according to the third embodiment concentrates the print jobs to the preliminary selected standby device to ensure effectively reducing the power consumption.

Not only the above-described embodiments, the disclosure can be also be implemented in the following modifications.

D. Modifications

Modification 1: While the embodiments configure the image forming system using the plurality of image forming apparatuses and the server, the image forming system may be configured without the server.

Modification 2: In the embodiment, when the print job including the sleep transition command is received in the sleep transition time slot, the energy-saving state managing unit immediately causes the operation mode to transition from the normal mode to the sleep mode without starting the timer. However, the energy-saving state managing unit is not limited to be thus configured but may be configured to shorten the standby period. When the print job including the sleep transition command is received in the sleep transition time slot, it is only necessary for the energy-saving state managing unit to switch the operation mode from the normal mode to the sleep mode before the lapse of the first standby period.

Modification 3: In the embodiment, while the image forming apparatus has the two operation modes, the normal mode and the sleep mode, the image forming apparatus may have a third operation mode. It is only necessary for the image forming apparatus to operate in the plurality of operation modes including the two operation modes, the normal mode and the sleep mode.

Modification 4: When the standby device cannot perform the printing, the embodiment performs the printing process without transferring the print job. Meanwhile, for example, the embodiment may transfer the print job to the image forming apparatus not selected as the standby device and supporting the sleep transition command.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming method comprising:
   in an image forming apparatus communicable with a personal computer via a network,
      operating the image forming apparatus in one of a plurality of operation modes that the image forming apparatus is configured to operate in, the operation modes including a first electric power mode in which the image forming apparatus performs image formation processes, and a second electric power mode in which the image forming apparatus consumes less power than the image forming apparatus consumes in the first electric power mode and in which the image forming apparatus does not perform image formation processes,
      storing weekly-timer setting data containing first and second time-slot settings according to which in a first time slot the image forming apparatus is kept in the first electric power mode and in a second time slot the image forming apparatus is kept in the second electric power mode or, following lapse of a preset standby period timed by starting a sleep timer, is transitioned into the second electric power mode from having been exceptionally transitioned into the first electric power mode,
      receiving a print job including print information indicating print content and image data as a print target, and
      keeping the image forming apparatus in the first electric power mode during the first time slot, keeping the image forming apparatus preliminarily in the second electric power mode during the second time slot unless the image forming apparatus is transitioned into the first electric power mode for an exceptional print job created by the personal computer during the second time slot, and transitioning the image forming apparatus into the second electric power mode after sleep-timer-timed lapse of a first preset standby period after the image forming apparatus completes the exceptional print job in the second time slot;
   in a personal computer communicable with the image forming apparatus via the network, acquiring the weekly-timer setting data from the image forming apparatus via the network, determining based on the weekly timer setting data whether the image forming apparatus is in the second time slot, and if the image forming apparatus is in the second time slot, providing the exceptional print job with a sleep transition command to instruct sleep-timer-independent, immediate transitioning of the image forming apparatus into the second electric power mode; and
   in the image forming apparatus, further
      when the image forming apparatus receives the exceptional print job including the sleep transition command with the image forming apparatus being in the second time slot, returning the operation mode of the image forming apparatus from the second electric power mode to the first electric power mode and executing the exceptional print job, and after termination of the exceptional print job, immediately causing the operation mode of the image forming apparatus to transition into the second electric power mode without starting the sleep timer;
      determining whether the exceptional print job is provided with the sleep transition command,
      if the exceptional print job is provided with a sleep transition command, determining whether the exceptional print job is a standby job, and if the exceptional print job provided with a sleep transition command is a standby job, suspending transitioning of the image forming apparatus into the second electric power mode until after termination of the standby job, and
      if the exceptional print job is not provided with a sleep transition command, starting the sleep timer and causing the operation mode of the image forming apparatus to transition into the second electric power mode after lapse of a second preset standby period shorter than the first preset standby period.

2. The image forming method according to claim 1, further comprising, in the image forming apparatus:
   detecting whether one or more exceptional print jobs scheduled to be processed subsequent to a current exceptional print job are present in situations where the current exceptional print job includes the sleep transition command; and
   ignoring the sleep transition command if exceptional print jobs scheduled to be processed subsequent to the current exceptional print job including the sleep transition command are detected.

3. The image forming method according to claim 2, wherein the exceptional print jobs further include user-specific information, the user-specific information indicating print-job owners as transmission sources of the print jobs, further comprising:
   when an owner of the current exceptional print job including the ignored sleep transition command differs from an owner of any exceptional print jobs scheduled to be processed, notifying the owner of the current exceptional print job including the ignored sleep transition command that the sleep transition command is being ignored.

4. The image forming method according to claim 3, further comprising:
   if a last exceptional print job of the exceptional print jobs scheduled to be processed does not include the sleep transition command, querying the owner of the last exceptional print job for approval to transition the image forming apparatus immediately into the second electric power mode upon completion of the last print job; and
   in the absence of approval from the owner of the last exceptional print job to transition the image forming apparatus immediately into the second electric power mode, transitioning the image forming apparatus into the second electric power mode after lapse of a third preset standby period, the third preset standby period being shorter than the second preset standby period.

5. An image forming system comprising:
   a personal computer communicable with an image forming apparatus via a network, the personal computer including a personal-computer control processor, and personal-computer storage storing a personal-computer control program whose execution configures the personal-computer control processor as a print job creating unit, a sleep-transition command providing unit, and a device setting acquiring unit; and
   an image forming apparatus communicable with the personal computer via the network, the image forming apparatus operating in one of a plurality of operation modes that the image forming apparatus is configured to operate in, the operation modes including a first electric power mode in which the image forming apparatus performs image formation processes, and a second electric power mode in which the image forming apparatus consumes less power than the image forming apparatus consumes in the first electric power mode and in which the image forming apparatus does not perform image formation processes, the image forming apparatus including a communication interface unit for receiving print jobs including print information indicating print content and image data as a print target, and an image-forming-apparatus control processor, and image-forming-apparatus storage network-accessibly storing weekly-timer setting data containing first and second time-slot settings according to which in a first time slot the image forming apparatus is kept in the first electric power mode and in a second time slot the image forming apparatus is kept in the second electric power mode or, following lapse of a preset standby period timed by starting a sleep timer, is transitioned to the second electric power mode from having been exceptionally transitioned into the first electric power mode, the image-forming-apparatus storage further storing an image-forming-apparatus control program whose execution configures the image-forming-apparatus control processor as an energy-saving state managing unit for keeping the image forming apparatus in the first electric power mode during the first time slot, for keeping the image forming apparatus preliminarily in the second electric power mode during the second time slot unless the image forming apparatus is transitioned into the first electric power mode for an exceptional print job created by the print job creating unit during the second time slot, and for transitioning the image forming apparatus into the second electric power mode after sleep-timer-timed lapse of a first preset standby period after the image forming apparatus completes the exceptional print job in the second time slot; wherein the device setting acquiring unit is configured to acquire the weekly-timer setting data from the image-forming-apparatus storage via the network, and the sleep-transition command providing unit is configured to determine, based on the weekly timer setting data, whether the image forming apparatus is in the second time slot, and if the image forming apparatus is in the second time slot, to provide the exceptional print job with a sleep transition command for instructing the energy-saving state managing unit to transition the image forming apparatus immediately into the second electric power mode independently of the sleep timer;

the energy-saving state managing unit is configured to when the energy-saving state managing unit receives the exceptional print job including the sleep transition command with the image forming apparatus being in the second time slot, return the operation mode of the image forming apparatus from the second electric power mode to the first electric power mode and execute the exceptional print job, and after termination of the exceptional print job, immediately cause the operation mode of the image forming apparatus to transition into the second electric power mode without starting the sleep timer, and when the image forming apparatus being in the second time slot receives a print job, determine whether the exceptional print job is a standby job, and if the exceptional print job provided with a sleep transition command is a standby job, suspend transitioning of the image forming apparatus into the second electric power mode until after termination of the standby job, and if the exceptional print job is not provided with a sleep transition command, start the sleep timer and cause the operation mode of the image forming apparatus to transition into the second electric power mode after lapse of a second preset standby period shorter than the first preset standby period.

6. The image forming system according to claim 5, wherein the energy-saving state managing unit is further configured to:

detect whether one or more exceptional print jobs scheduled to be processed subsequent to a current exceptional print job are present in situations where the current exceptional print job includes the sleep transition command; and ignore the sleep transition command if exceptional print jobs scheduled to be processed subsequent to the current exceptional print job including the sleep transition command are detected.

7. The image forming system according to claim 6, wherein:

the exceptional print jobs further include user-specific information, the user-specific information indicating print-job owners as transmission sources of the print jobs; and when an owner of the current exceptional print job including the ignored sleep transition command differs from an owner of any exceptional print jobs scheduled to be processed, the energy-saving state managing unit notifies the owner of the current exceptional print job including the ignored sleep transition command that the sleep transition command is being ignored.

8. The image forming system according to claim 7, wherein:

if a last exceptional print job of the exceptional print jobs scheduled to be processed does not include the sleep transition command, querying the owner of the last exceptional print job for approval to transition the image forming apparatus immediately into the second electric power mode upon completion of the last print job; and in the absence of approval from the owner of the last exceptional print job to transition the image forming apparatus immediately into the second electric power mode, the energy-saving state managing unit transitions the image forming apparatus into the second electric power mode after lapse of a third preset standby period, the third preset standby period being shorter than the second preset standby period.

9. A non-transitory computer-readable recording medium storing an image forming program to control an image forming apparatus and a personal computer, the image forming apparatus communicable with the personal computer via a network, the image forming program being program instructions stored in the recording medium, the image forming program causing the image forming apparatus and the personal computer to perform processes including, in execution by at least one control processor in the personal computer and one control processor in the image forming apparatus:

in the image forming apparatus,
an image formation process of operating the image forming apparatus in one of a plurality of operation modes that the image forming apparatus is configured to operate in, the operation modes including a first electric power mode in which the image forming apparatus performs image formation processes, and a second electric power mode in which the image forming apparatus consumes less power than the image forming apparatus consumes in the first electric power mode and in which the image forming apparatus does not perform image formation processes;

a weekly-timer setting data storing process of storing weekly-timer setting data containing first and second time-slot settings according to which in a first time slot the image forming apparatus is kept in the first electric power mode and in a second time slot the image forming apparatus is kept in the second electric power mode or, following lapse of a preset standby period timed by starting a sleep timer, is transitioned into the second electric power mode from having been exceptionally transitioned into the first electric power mode;

a print job receiving process of receiving a print job including print information indicating print content and image data as a print target; and a transitioning process of keeping the image forming apparatus in the first electric power mode during the first time slot, keeping the image forming apparatus preliminarily in the second electric power mode during the second time slot unless the image forming apparatus is transitioned into the first electric power mode for an exceptional print job created by the personal computer during the second time slot, and transitioning the image forming apparatus into the second electric power mode after sleep-timer-timed lapse of a first preset standby period after the image forming apparatus completes the exceptional print job in the second time slot;

in the personal computer, a specified print-job creating process of acquiring the weekly-timer setting data from the image forming apparatus via the network, determining based on the weekly timer setting data whether the image forming apparatus is in the second time slot, and if the image forming apparatus is in the second time slot, providing the exceptional print job with a sleep transition command to instruct sleep-timer-independent, immediate transitioning of the image forming apparatus into the second electric power mode;

a power-mode transitioning process of, when the image forming apparatus receives the exceptional print job including the sleep transition command with the image forming apparatus being in the second time slot, returning the operation mode of the image forming apparatus from the second electric power mode to the first electric power mode and executing the exceptional print job, and after termination of the exceptional print job, immediately causing the operation mode of the image forming apparatus to transition into the second electric power mode without starting the sleep timer; and in the image forming apparatus, a standby-job confirmation process of
determining whether the exceptional print job is provided with the sleep transition command,
if the exceptional print job is provided with a sleep transition command, determining whether the exceptional print job is a standby job, and if the exceptional print job provided with a sleep transition command is a standby job, suspending transitioning of the image forming apparatus into the second electric power mode until after termination of the standby job, and
if the exceptional print job is not provided with a sleep transition command, starting the sleep timer and causing the operation mode of the image forming apparatus to transition into the second electric power mode after lapse of a second preset standby period shorter than the first preset standby period.

10. The recording medium according to claim 9, wherein the processes that the image forming program causes the image forming apparatus and the personal computer to perform further includes, in the image forming apparatus:
detecting whether one or more exceptional print jobs scheduled to be processed subsequent to a current exceptional print job are present in situations where the current exceptional print job includes the sleep transition command; wherein
the power-mode transitioning process ignores the sleep transition command if exceptional print jobs scheduled to be processed subsequent to the current exceptional print job including the sleep transition command are detected.

11. The recording medium according to claim 10, wherein:
the exceptional print jobs further include user-specific information, the user-specific information indicating print-job owners as transmission sources of the print jobs; and
when an owner of the current exceptional print job including the ignored sleep transition command differs from an owner of any exceptional print jobs scheduled to be processed, the power-mode transitioning process notifies the owner of the current exceptional print job including the ignored sleep transition command that the sleep transition command is being ignored.

* * * * *